(12) United States Patent
Krokhalev et al.

(10) Patent No.: US 11,568,589 B2
(45) Date of Patent: *Jan. 31, 2023

(54) PHOTOREALISTIC REAL-TIME PORTRAIT ANIMATION

(71) Applicant: Snap Inc., Santa Monica, CA (US)

(72) Inventors: Eugene Krokhalev, London (GB); Aleksandr Mashrabov, Los Angeles, CA (US); Pavel Savchenkov, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,796

(22) Filed: May 24, 2022

(65) Prior Publication Data

US 2022/0284654 A1    Sep. 8, 2022

Related U.S. Application Data

(63) Continuation of application No. 17/325,225, filed on May 20, 2021, now Pat. No. 11,393,152, which is a continuation of application No. 16/251,472, filed on Jan. 18, 2019, now Pat. No. 11,049,310.

(51) Int. Cl.
*G06T 13/80* (2011.01)
*G06T 7/174* (2017.01)
*G06V 40/16* (2022.01)

(52) U.S. Cl.
CPC .............. *G06T 13/80* (2013.01); *G06T 7/174* (2017.01); *G06V 40/167* (2022.01); *G06T 2207/20084* (2013.01)

(58) Field of Classification Search
CPC  G06T 13/80; G06T 7/174; G06T 2207/20084
See application file for complete search history.

(56) References Cited

U.S. PATENT DOCUMENTS

| | | | | |
|---|---|---|---|---|
| 2002/0012454 | A1* | 1/2002 | Liu | G06V 40/171 375/E7.263 |
| 2003/0198402 | A1* | 10/2003 | Zhang | G06T 15/04 345/646 |
| 2012/0321134 | A1* | 12/2012 | Shen | G06V 10/7557 382/103 |
| 2014/0233849 | A1* | 8/2014 | Weng | G06T 19/20 382/154 |
| 2018/0253593 | A1* | 9/2018 | Hu | G06V 40/165 |
| 2019/0080457 | A1* | 3/2019 | Shukla | G06T 5/003 |

* cited by examiner

*Primary Examiner* — Terrell M Robinson
(74) *Attorney, Agent, or Firm* — Georgiy L. Khayet

(57) ABSTRACT

Disclosed are systems and methods for portrait animation. An example method includes receiving, by a computing device, a scenario video, where the scenario video includes at least one input frame and the at least one input frame includes a first face, receiving, by the computing device, a target image, where the target image includes a second face, determining, by the computing device and based on the at least one input frame and the target image, two-dimensional (2D) deformations of the second face in the target image, where the 2D deformations, when applied to the second face, modify the second face to imitate at least a facial expression of the first face, and applying, by the computing device, the 2D deformations to the target image to obtain at least one output frame of an output video.

20 Claims, 13 Drawing Sheets

PHOTOREALISTIC REAL-TIME PORTRAIT ANIMATION

CROSS-REFERENCE TO RELATED APPLICATION

This application is a Continuation of and claims the priority benefit of U.S. patent application Ser. No. 17/325,225, entitled "PHOTOREALISTIC REAL-TIME PORTRAIT ANIMATION", filed on May 20, 2021, which in turn is a Continuation of and claims the priority benefit of U.S. patent application Ser. No. 16/251,472, entitled "SYSTEMS AND METHODS FOR PHOTOREALISTIC REAL-TIME PORTRAIT ANIMATION", filed on Jan. 18, 2019. The subject matter of the aforementioned applications is incorporated herein by reference in their entirety for all purposes.

TECHNICAL FIELD

This disclosure generally relates to digital image processing. More particularly, this disclosure relates to methods and systems for photorealistic real-time portrait animation.

BACKGROUND

Portrait animation can be used in many applications, such as entertainment shows, computer games, video conversations, virtual reality, augmented reality, and the like.

Some current techniques for portrait animation utilize morphable face models to re-render a face with different facial expressions. While generation of a face with a morphable face model can be fast, the resulting face is typically not photorealistic. Some other current techniques for portrait animation can be based on use of deep learning methods to re-render a face with different facial expressions.

Deep learning methods may allow obtaining photorealistic results. However, the deep learning methods are time-consuming and are not suitable to perform a real-time portrait animation on standard mobile devices.

BRIEF DESCRIPTION OF THE DRAWINGS

Embodiments are illustrated by way of example and not limitation in the figures of the accompanying drawings, in which like references indicate similar elements.

DETAILED DESCRIPTION OF EXAMPLE EMBODIMENTS

Figure 1:
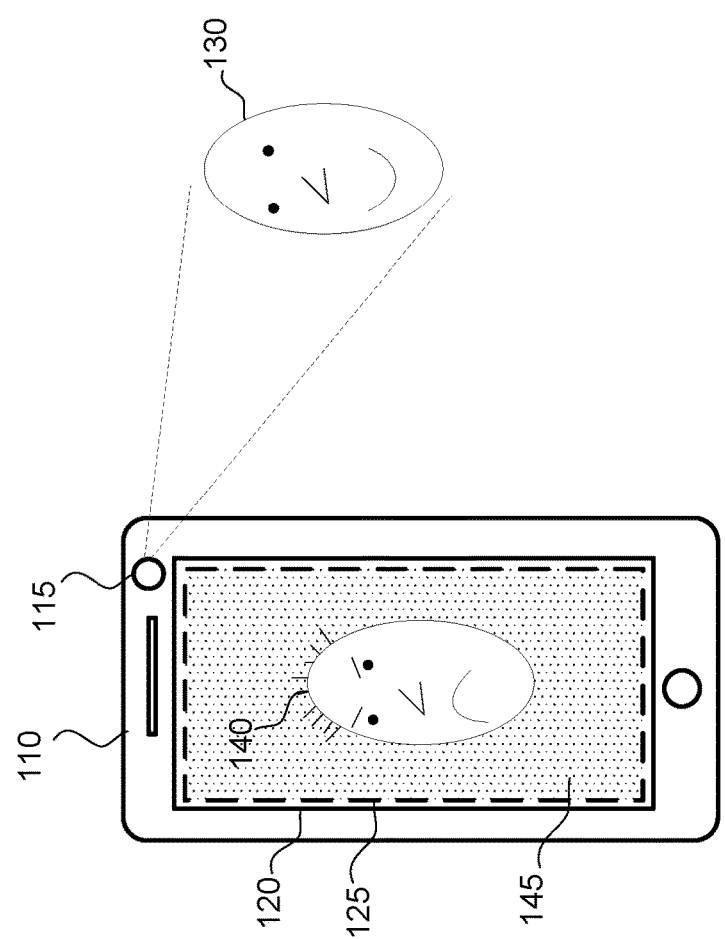
FIG. 1 is a block diagram showing an example environment in which methods for portrait animation can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The present disclosure can be implemented using a variety of technologies. For example, methods described herein can be implemented by software running on a computer system or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium. It should be noted that methods disclosed herein can be implemented by a computing device such as a mobile device, personal computer, server, network node, and so forth.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

This disclosure relates to methods and systems for portrait animation. The present disclosure can be designed to work on mobile devices, such as smartphones, tablet computers, or mobile phones, in real-time and without connection to the Internet or the need for use of server-side computational resources, although the embodiments can be extended to approaches involving web service or a cloud-based resources.

Some embodiments of the disclosure may allow animation of a target image having a target face. The target face can be manipulated by facial expressions of a source face in real time. Some embodiments can be used to significantly reduce the computational time for photorealistic portrait animation. Embodiments of the present disclosure require only a single target image to achieve realistic results while existing facial animation techniques typically use a video or a series of images of the target face.

Some embodiments of the present disclosure may allow using a 3D model of a source video to generate a 2D deformations field induced by a change in 3D face and applying the 2D deformations directly to the target image. Embodiments of the present disclosure may allow implementing the method for photorealistic real-time portrait animation on a mobile device and perform the animation in real time. In contrast, other methods that edit 3D face properties, require accurate segmentation and texture mapping and, therefore, are very time-consuming.

Embodiments of the present disclosure can allow a user to create a scenario, so that the user only needs to indicate expressions, movements, and so forth the user wants to see on a target face. The expressions and movements can be chosen, for example, from the following list: frown, smile, look down, and so forth.

According to one embodiment of the disclosure, an example method for portrait animation can include receiving, by a computing device, a scenario video. The scenario video can include at least one input frame. The at least one input frame can include a first face. The method may further include receiving, by the computing device, a target image. The target image can include a second face. The method can further include determining, by a computing device and based on the at least one input frame and the target image, two-dimensional (2D) deformations, wherein the 2D deformations, when applied to the second face, modify the second face to imitate at least a facial expression and a head orientation of the first face. The method may include applying, by the computing device, the 2D deformations to the target image to obtain at least one output frame of an output video.

According to one embodiments of the disclosure, a method for photorealistic real-time portrait animation is provided. The method may include receiving, by a computing device, a scenario video. The scenario video may include at least one input frame. The at least one input frame may include a first face. The method may further include receiving, by the computing device, a target image. The target image may include a second face. The method may further include determining, by a computing device and, based on the at least one input frame and the target image, two-dimensional (2D) deformations, wherein the 2D deformations, when applied to the second face, modify the second face to imitate at least a facial expression and a head orientation of the first face. The method may further include applying, by the computing device, the 2D deformations to the target image to obtain at least one output frame of an output video.

In some embodiments, the method may further include, prior to applying 2D deformations, performing, by the computing device and using a deep neural network (DNN), segmentation of the target image to obtain an image of the second face and a background. The 2D deformations can be applied to the image of the second face to obtain the deformed face while keeping the background unchanged.

In some embodiments, the method may further include, upon applying 2D deformations, inserting, by the computing device, the deformed face into the background. The method may further include predicting, by the computing device and using the DNN, a portion of the background in gaps between the deformed face and the background. The method may further allow filling, by the computing device, the gaps with the predicted portions.

In some embodiments, determining 2D deformations may include determining, by the computing device, first control points on the first face and second control points on the second face. The method may further include defining, by the computing device, 2D deformations or affine transformations for aligning the first control points to the second control points.

In some embodiments, determining 2D deformations may include building, by the computing device, a triangulation of the second control points. Determining the 2D deformations may further include determining, by the computing device, displacements of the first control points in the at least one input frame. Determining the 2D deformations may further include projecting, by the computing device and using the affine transformation, the displacements on the target image, to obtain expected displacements of the second control points. Determining the 2D deformations may further include determining, by the computing device and based on the expected displacements, a warp field to be used as the 2D deformations.

In some embodiments, the warp field includes a set of a piecewise linear transformations defined by changes of triangles in the triangulation of the second control points.

In some embodiments, the method may further include generating, by the computing device, a mouth region and an eyes region. The method may further include inserting, by the computing device, the mouth region and the eyes region into the at least one output frame.

In some embodiments, generating the one of the mouth region and the eyes region includes transferring, by the computing device, the mouth region and the eyes region from the first face.

In some embodiments, generating the mouth region and the eyes region may include fitting, by the computing device, a three-dimensional (3D) face model to the first control points to obtain a first set of parameters. The first set of parameters may include at least a first facial expression. Generating the one of the mouth region and the eyes region may further include fitting, by the computing device, the 3D face model to the second control points to obtain a second set of parameters. The second set of parameters may include at least second facial expression. The first facial expression from the first set of parameters can be transferred to the second set of parameters. Generation of the mouth region and the eyes region may further include synthesizing, by the computing device and using the 3D face model, the one of the mouth region and the eyes region.

According to another embodiment, a system for photorealistic real-time portrait animation is provided. The system may include at least one processor and a memory storing processor-executable codes, wherein the at least one processor can be configured to implement operations of the above-mentioned method for photorealistic real-time portrait animation upon execution of the processor-executable codes.

According to yet another aspect of the disclosure, there is provided a non-transitory processor-readable medium, which stores processor-readable instructions. When the processor-readable instructions are executed by a processor, they cause the processor to implement the above-mentioned method for photorealistic real-time portrait animation.

Referring now to the drawings, exemplary embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows an example environment 100, wherein a method for portrait animation can be practiced. The environment 100 may include a computing device 110 and a user 130. The computing device 110 may include a camera 115 and a graphical display system 120. The computing device 110 can refer to a mobile device such as a mobile phone, smartphone, or tablet computer. In further embodiments, however, the computing device 110 can refer to a personal computer, laptop computer, netbook, set top box, television device, multimedia device, personal digital assistant, game console, entertainment system, infotainment system, vehicle computer, or any other computing device.

In certain embodiments, the computing device 110 may be configured to capture a scenario video, via, for example, the camera 115. The scenario video may include at least a face of the user 130 (also referred as a source face). In some other embodiments, the scenario video can be stored in the memory storage of the computing device 110 or in a cloud-based computing resource the computing device 110 being communicatively connected to. The scenario video may include a video of a person, for example user 130 or a different person, who can talk, move head, and express various emotions.

In some embodiments of the disclosure, the computing device 110 can be configured to display a target image 125. The target image 125 may include at least a target face 140 and a background 145. The target face 140 may belong to a person other than the user 130 or another person depicted in the scenario video. In some embodiments, the target image 125 can be stored in a memory storage of the computing device 110 or in a cloud-based computing resource to which the computing device 110 is communicatively connected to.

In yet other embodiments, different scenario videos and target image can be pre-recorded and stored in the memory of the computing device 110 or in the cloud-based computing resource. A user 130 may select the target image to be animated and one of the scenario videos to be used to animate the target image.

According to various embodiments of the disclosure, the computing device 110 can be configured to analyze the scenario video to extract facial expressions and movement of person depicted in the scenario video. The computing device 110 can be further configured to transfer the facial expressions and movement of the person to the target face in target image 125 to make the target face 140 to repeat the facial expression and movement of the person in the scenario video in real time and in photorealistic manner. In further embodiments, the computing device can be further configured to modify the target image 125 to make the target face 140 to repeat a speech of the person depicted in the scenario video.

Figure 2:
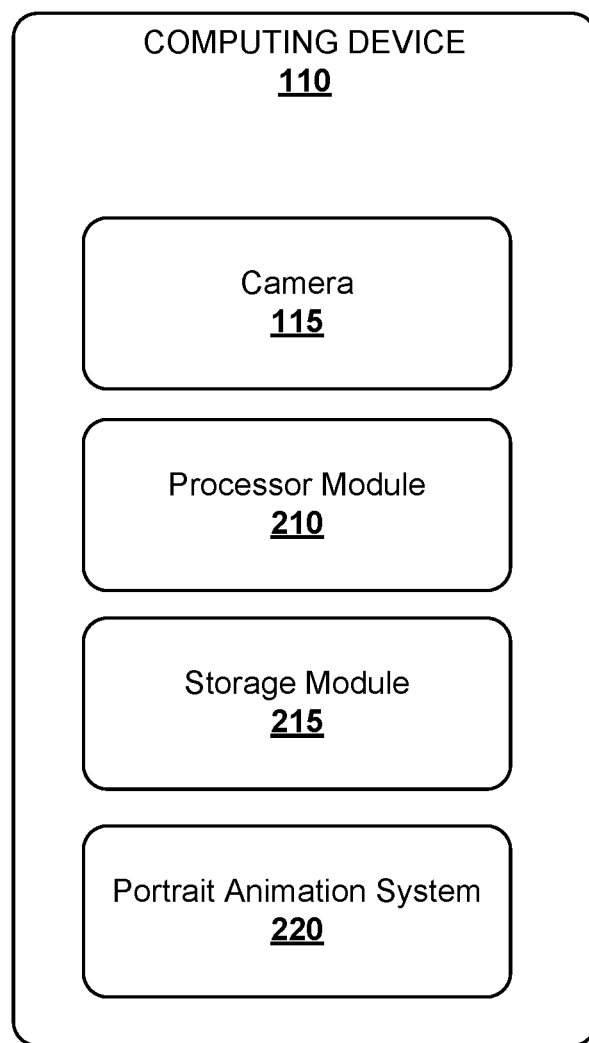
FIG. 2 is a block diagram showing an example embodiment of a computing device for implementing methods for portrait animation.

In the example shown in FIG. 2, the computing device 110 may include both hardware components and software components. Particularly, the computing device 110 may include the camera 115 or any other image-capturing device or scanner to acquire digital images. The computing device 110 can further include a processor module 210 and a storage module 215 for storing software components and processor-readable (machine-readable) instructions or codes, which when performed by the processor module 210, cause the computing device 200 to perform at least some steps of methods for portrait animation as described herein.

The computing device 110 can further include a portrait animation system 220, which, in turn, can include hardware components (e.g., a separate processing module and memory), software components, or a combination thereof.

Figure 3:
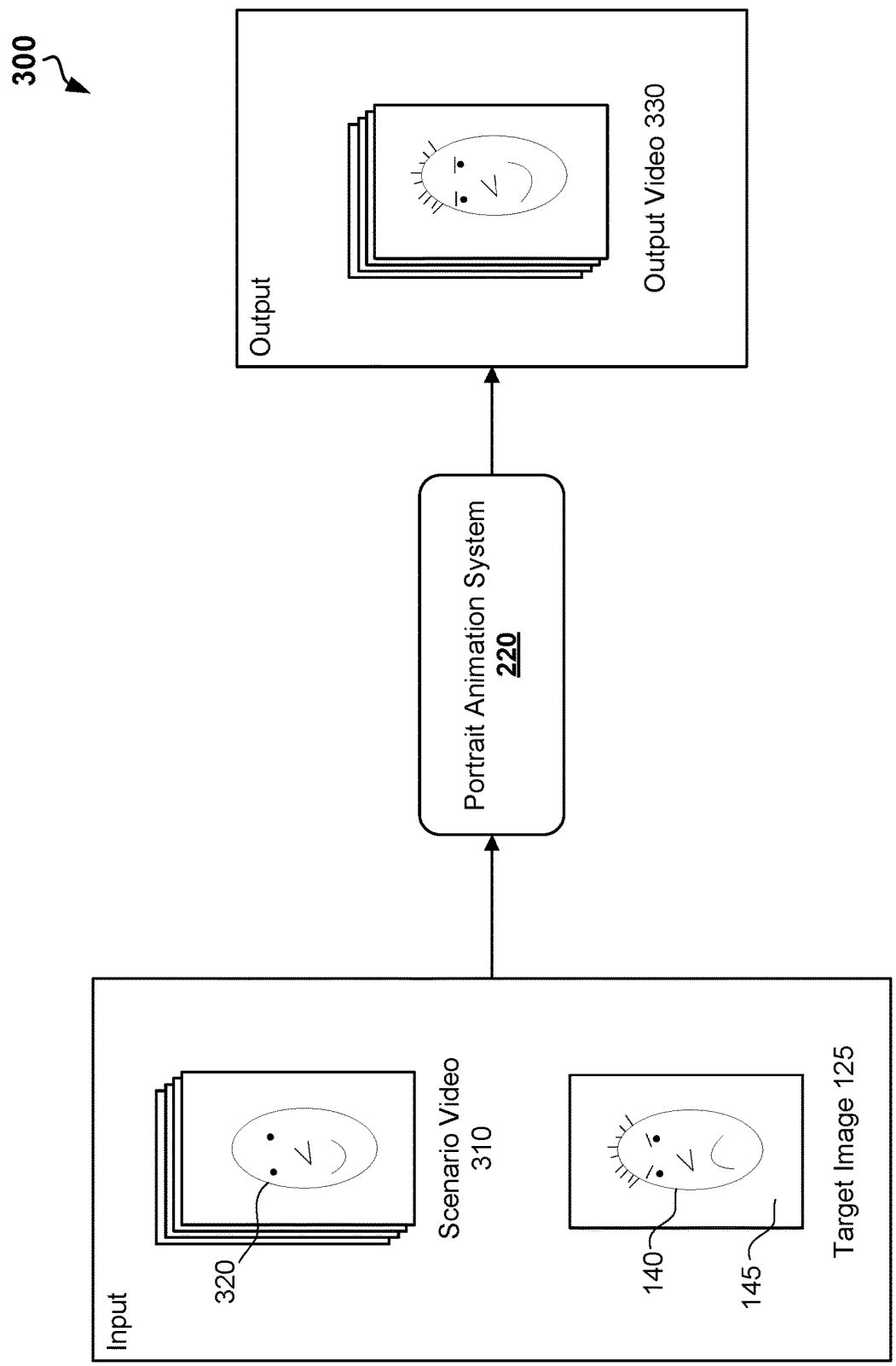
FIG. 3 is a schematic showing an example process of portrait animation, according to an example embodiment.

As shown in FIG. 3, the portrait animation system 220 can be configured to receive, as an input, a target image 125 and a scenario video 310. The target image 125 may include a target face 140 and background 145. The scenario video 310 may depict at least a head and a face of a person 320 who can talk, move the head, and express emotions. The portrait animation system 220 can be configured analyze a frame of the scenario video 310 to determine facial expression (an emotion) and head movement of the person 320. The portrait animation system may be further configured to change the target image 125 by transferring facial expression and head movements of the person 320 to the target face 140, and by so obtain a frame of an output video 330. The determination of the facial expression and head movement of the person 320 and transferring the facial expression and head movement to the target face 125 can be repeated for each frame of the scenario video 310. The output video 330 may include the same number of frames as the scenario video 310. As result, the output video 330 may represent an animation of the target image 125. In some embodiments, the animation can be carried out by performing 2D deformations of the target image 125, wherein the 2D deformations imitate the facial expression and the head movements. In some embodiments, the 2D deformations can be followed by generation of hidden regions and fine-scale details to achieve photorealistic result. The hidden regions may include a mouth region of the target face 140.

Figure 4:
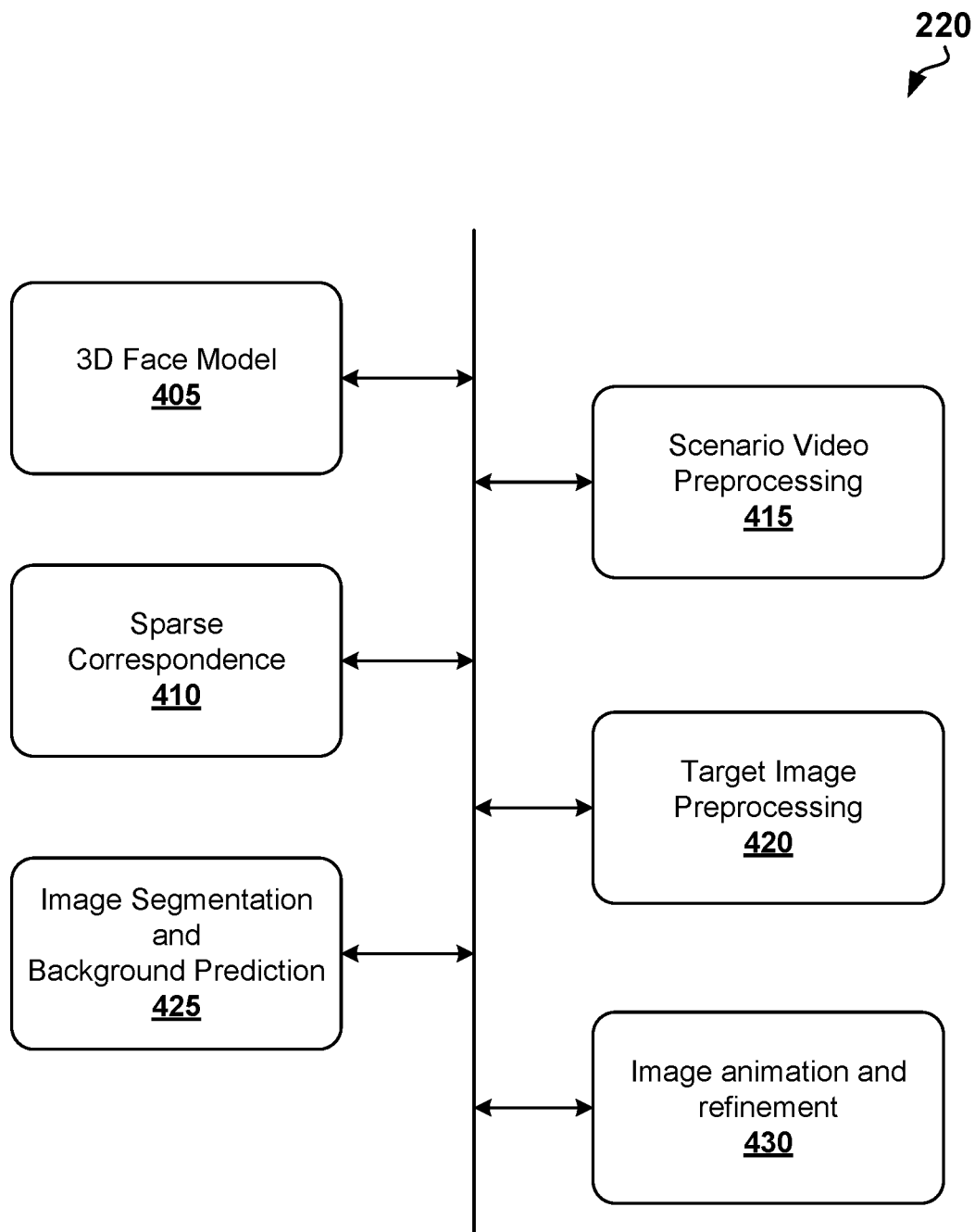
FIG. 4 shows a block diagram of a system for portrait animation, in accordance with an example embodiment.

FIG. 4 is a block diagram of a portrait animation system 220, according to one example embodiment. The portrait animation system 220 can include a 3D face model 405, a sparse correspondence module 410, a scenario video pre-processing module 415, a target image pre-processing module 420, image segmentation and background prediction module 425, and image animation and refinement module 430. The modules 405-430 can be implemented as software components for use with hardware devices such as computing device 110, a server, and the like.

In some embodiments of the disclosure, the 3D face model 405 can be pre-generated based on images of a pre-defined number of individuals of different age, gender, and ethnic background. For each individual, the images may include an image of the individual having a neutral facial expression and one or more images of the individual having different facial expressions. The facial expression may include mouth-open, smiling, angry, astonished, and so forth.

The 3D face model 405 may include a template mesh with a pre-determined number of vertices. The template mesh may be represented as 3D triangulation defining a shape of a head. Each of the individuals can be associated with an individual-specific blend shape. The individual-specific blend shape can be adjusted to the template mesh. The individual-specific blend shape may correspond to specific coordinates of vertices in the template mesh. Thus, different images of individuals may correspond to the template mesh of the same structure; however, coordinates of vertices in the template mesh are different for the different images.

In some embodiments of the disclosure, the 3D face model 405 may include a bilinear face model depending on two parameters: facial identity and facial expression. The bilinear face model can be built based on blend shapes corresponding to the images of individuals. Thus, the 3D face model includes the template mesh of a pre-determined structure, wherein the coordinates of vertices depend on facial identity and facial expression. The facial identity may represent a geometrical shape of a head.

In some embodiments, the sparse correspondence module 410 can be configured to determine a sparse correspondence between frames of the scenario video 310 frames and target image 125. The sparse correspondence module 410 can be configured to obtain a set of control points (facial landmarks), which can be robustly tracked through the scenario video. Facial landmarks and additional control points can be tracked using state-of-the-art tracking methods, such as optical flow. The sparse correspondence module 410 can be configured to determine an affine transformation that approximately aligns the facial landmarks in the first frame of the scenario video 310 and in the target image 125. The affine transformation can be further used to predict the location of additional control points in the target image 125. The sparse correspondence module 410 can be further configured to build a triangulation of the control points.

In some embodiments, the scenario video preprocessing module 415 can be configured to detect 2D facial landmarks in each frame of the scenario video 310. The scenario video preprocessing module 415 can be configured to fit the 3D face model 405 to the facial landmarks to find parameters of 3D face model 405 for the person depicted in the scenario video 310. The scenario video preprocessing module 415 can be configured to determine location of the 2D facial landmarks on the template mesh of the 3D face model. It can be assumed that the facial identity is the same for all frames of the scenario video 310. The module 415 can be further configured to approximate the resulting changes of 3D face parameters for each frame of the scenario video 310. The scenario video preprocessing module 415 can be configured to receive manual annotations and add the annotations to the parameters of the frame. In some embodiments, the annotations can be made using third-party animation and modeling applications, such as Maya™. The module 415 can be further configured to select the control points and track the location of the control points in each frame of the scenario video 310. In certain embodiments, the module 415 can be configured to perform segmentation of mouth interior in each frame of the scenario video 310.

In some embodiments, the target image preprocessing module 420 may be configured to detect 2D facial landmarks and visible parts of the head in the target image 125 and fit the 3D facial model to the 2D facial landmarks and visible parts of the head in the target image 125. The target image may include a target face. The target face may not have a neutral facial expression, eyes closed or mouth open, and a person depicted on the target image may be of a different age than the person depicted in the scenario video 310. The module 430 can be configured to normalize the target face, for example rotate the head to a neutral state, close the mouth or open the eyes of the target face. Facial landmark detection and 3D face model fitting can be carried out using an iterative process. In some embodiments, the iterative process can be optimized for central processing unit (CPU) and graphics processing unit (GPU) of a mobile device which may allow to significantly decrease the time needed for pre-processing of the target image 125 and the scenario video 310.

In some embodiments, the target image preprocessing module 420 can be further configured to apply beauty effects or change the appearance of person depicted on the target image 125. For example, change the hair color or hairstyle of the person can be changed or the person can be made to look older or younger.

In some embodiments, the image segmentation and background separation module can be configured to perform segmentation of a head of a person from image of the person. The segmentation of the head can be performed for the target image to obtain image of the head or the target face 140. Animation can be further carried out on the image of the head or the target face 140. The animated head or target face 140 can be further inserted back into the background 145. Animating only image of the head or face target 140 by applying 2D deformation may help to avoid unnecessary changes in background 145 which may be caused by the 2D deformations. Since the animation may include changes in head pose, some parts of background which are previously invisible may become visible leading to gaps in the resulting image. To fill the gaps, the part of the background which is covered by the head can be predicted. In some embodiments, a deep learning model can be trained to perform the segmentation of a person's head from an image. Similarly, deep learning techniques can be used for predictions of background. Details of deep learning technique for image segmentation and background prediction is described with reference to FIGS. 8-13 below.

In some embodiments, the image animation and refinement module 430 can be configured to animate target image frame by frame. For each frame of the scenario video 310, changes in positions of the control points can be determined. The changes in position of control points can be projected onto the target image 125. The module 430 can be further configured to build a warp field. The warp field can include a set of piecewise linear transformations induced by changes of each triangle in triangulation of the control points. The module 430 can be further configured to apply the warp field to the target image 125 and by so to produce a frame of output video 330. Application of the warp field to an image can be performed relatively fast. It may allow the animation to be performed in real time.

In some embodiments, the image animation and refinement module can be further configured to generate hidden regions, for example, the inner mouth region. Several approaches can be used to generate the hidden region. One approach may include transferring mouth interior from a person in the scenario video 310 to mouth interior of person in target image. Another approach may include generating hidden regions with use of a 3D mouth model. The 3D mouth model can match into geometry of 3D face model.

In some embodiments, if the person in the scenario video 310 closes eyes or winks, the module 430 can be configured to synthesize realistic eyelids in target image by extrapolation. The skin color of the eyelids may be generated to match the color of target image. To match skin color the module 430 can be configured to transfer eyes expression from the 3D face model built for the frame of the scenario video 310, to the 3D face model built for the target image 125, and insert generated eyes regions to the target image.

In some embodiments, the module 430 can be configured to generate partly occluded regions (like mouth, iris, or eyelids) and fine-scale details. Generative adversarial networks could be used to synthesize realistic textures and realistic eye images. The module 430 may further configured to replace eyes in the hidden regions of the target image with the realistic eye images generated using the generative adversarial networks. The module 430 can be configured to generate, based on the target image and original and current parameters of 3D face model, the photorealistic textures and fine-scale details for the target image. The module 430 may further refine the target image by replacing hidden regions with generated photorealistic textures and applying the fine-scale details to the whole target image. Applying the fine-scale details may include applying shadow masks to each frame of the target image.

In some embodiments, the module 430 can be further configured to apply other effects (for example, color correction and light correction) on target image that are required to make the animation look realistic.

Figure 5:
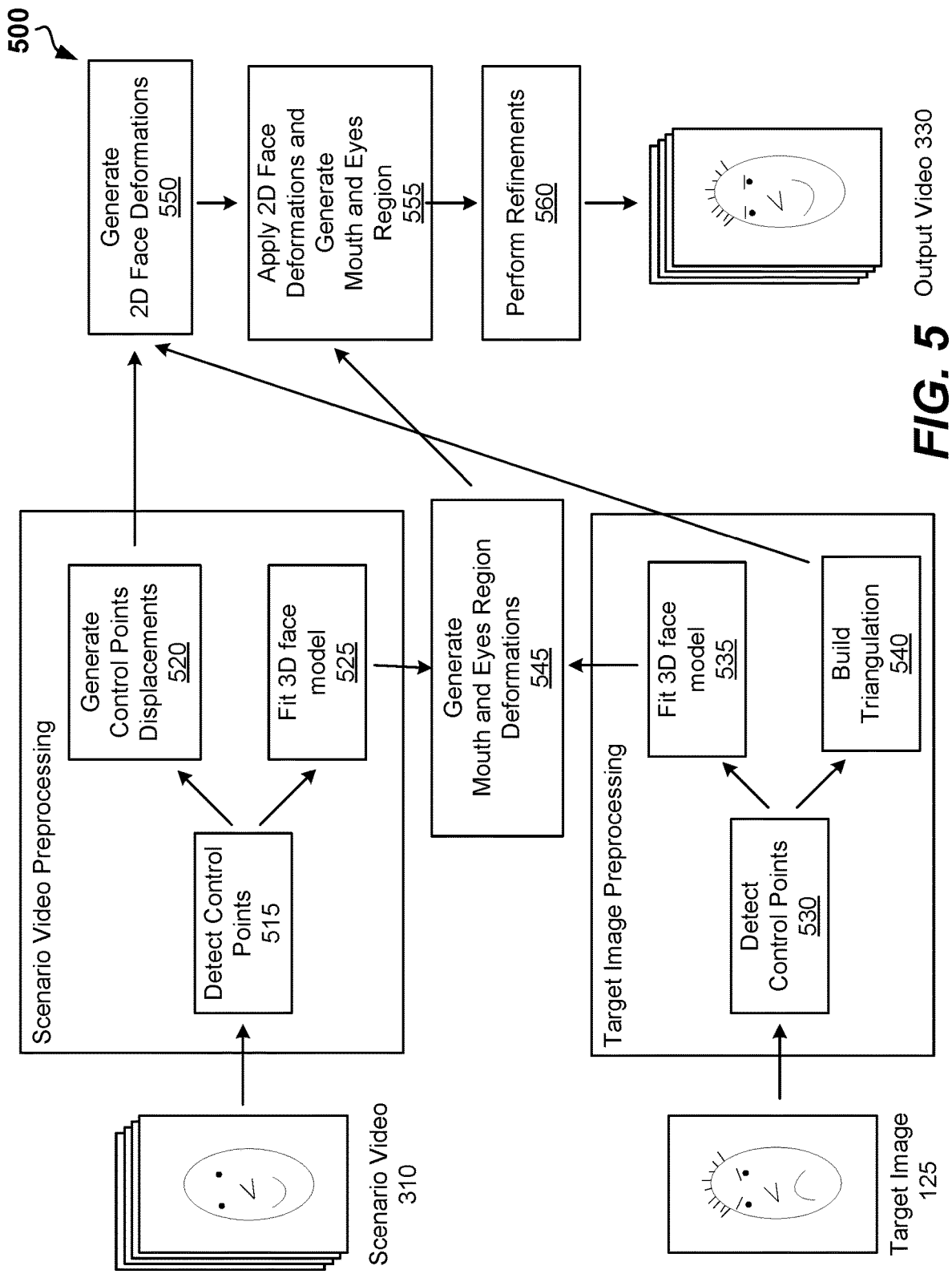
FIG. 5 shows a process flow chart diagram of a method for portrait animation, in accordance with some example embodiments.

Further embodiments of the present disclosure may allow transferring not just facial expressions and head movements of a subject in the scenario video, but also a body pose and orientation, gestures, and so forth. For example, a specialized hair model can be used to improve the hair representation during significant head rotations. Generative adversarial networks can be used to synthesize target body pose imitating the source body pose in a realistic fashion. FIG. 5 is a flow chart showing a method 500 for portrait animation, according to one example embodiment. The method 500 can be performed by computing device 110 and portrait animation system 220.

The method 500 may include preprocessing scenario video in blocks 515-525. The method 500 can commence in block 505 with detecting, by the computing device 110, control points (for example, 2D facial landmarks) in a frame of scenario video. In block 520, the method 500 may include generating, by the by the computing device 110, displacements of the control points in the frame of the scenario video. In block 525, the method 500 may include fitting, by the computing device 110, a 3D face model to the control points in the frame of the scenario video to obtain parameters of the 3D face model for the frame of the scenario video.

In blocks 530-540 the method 500 may include preprocessing of a target image. The target image may include a target face. In block 530, the method 500 may include detecting, by the computing device 110, control points (for example, facial landmarks) in the target image. In block 535, the method 500 may include fitting, by the computing device 110, a 3D face model to the control points in the target image to obtain parameters of the 3D face model for the target image. In block 540, the method 500 may include building triangulation of the control points in the target image.

In block 545, the method 500 may include generating, by a computing device 110 and based on parameters of 3D face model for the image and parameters of 3D face model for the frame of the scenario video, deformation of mouth and eyes region.

In block 550, the method 500 may include generating, by the computing device 110, and based on displacements of the control points in the frame of the scenario video and triangulations of the control points in the target image, 2D face deformations (a warp field). The 2D face deformations may include a set of affine transformations of triangles of some of 2D triangulations of a face and background in the target image. The triangulation topology can be shared between the frame of the scenario video and target image.

In block 555, the method 500 may include applying, by the computing device 110, the 2D face deformations to the target image to obtain a frame of an output video. The method 500 may further include generating, by the computing device 110 and based on mouth and eyes region deformation, mouth and eyes region in the target image.

In block 560, the method 500 may include performing refinements in the frame of the output video. The refinements may include color and light corrections.

Thus, the target image 125 can be animated through generated series of 2D deformations that imitate the facial transformations in the frames of the scenario video. This process can be very fast and makes it look like the animation is performed in real time. Some of 2D deformations can be extracted from the frames of the source video and stored in advance. Additionally, background restoration methods can be applied to achieve a photorealistic effect of making the target image live.

Figure 6:
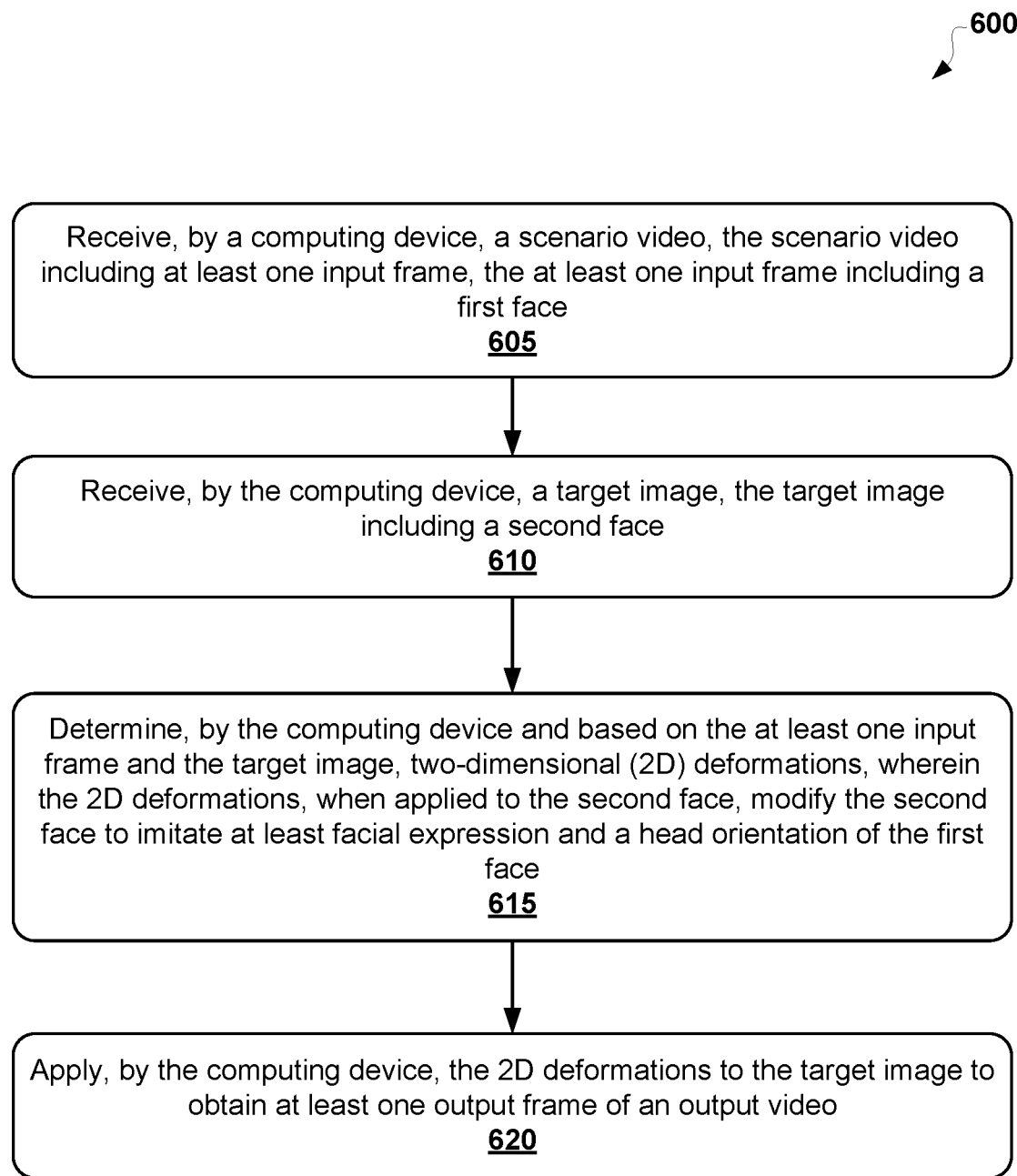
FIG. 6 shows a process flow chart diagram of a method for portrait animation, in accordance with some example embodiments.

FIG. 6 is a flow chart showing a method 600 for portrait animation, according to some example embodiments. The method 600 can be performed by computing device 110. The method 600 may commence, in block 605, with receiving, by the computing device, a scenario video. The scenario video may include at least one input frame. The input frame may include a first face. In block 610, the method 600 may include receiving, by the computing device, a target image. The target image may include a second face. In block 615, the method 600 may include determining, by the computing device and based on the at least one input frame and the target image, two-dimensional (2D) deformations, wherein the 2D deformations when being applied to the second face modify the second face to imitate at least a facial expression and a head orientation of the first face. In block 620, the method 600 may include applying, by the computing device, the 2D deformations to the target image to obtain at least one output frame of an output video.

Figure 7:
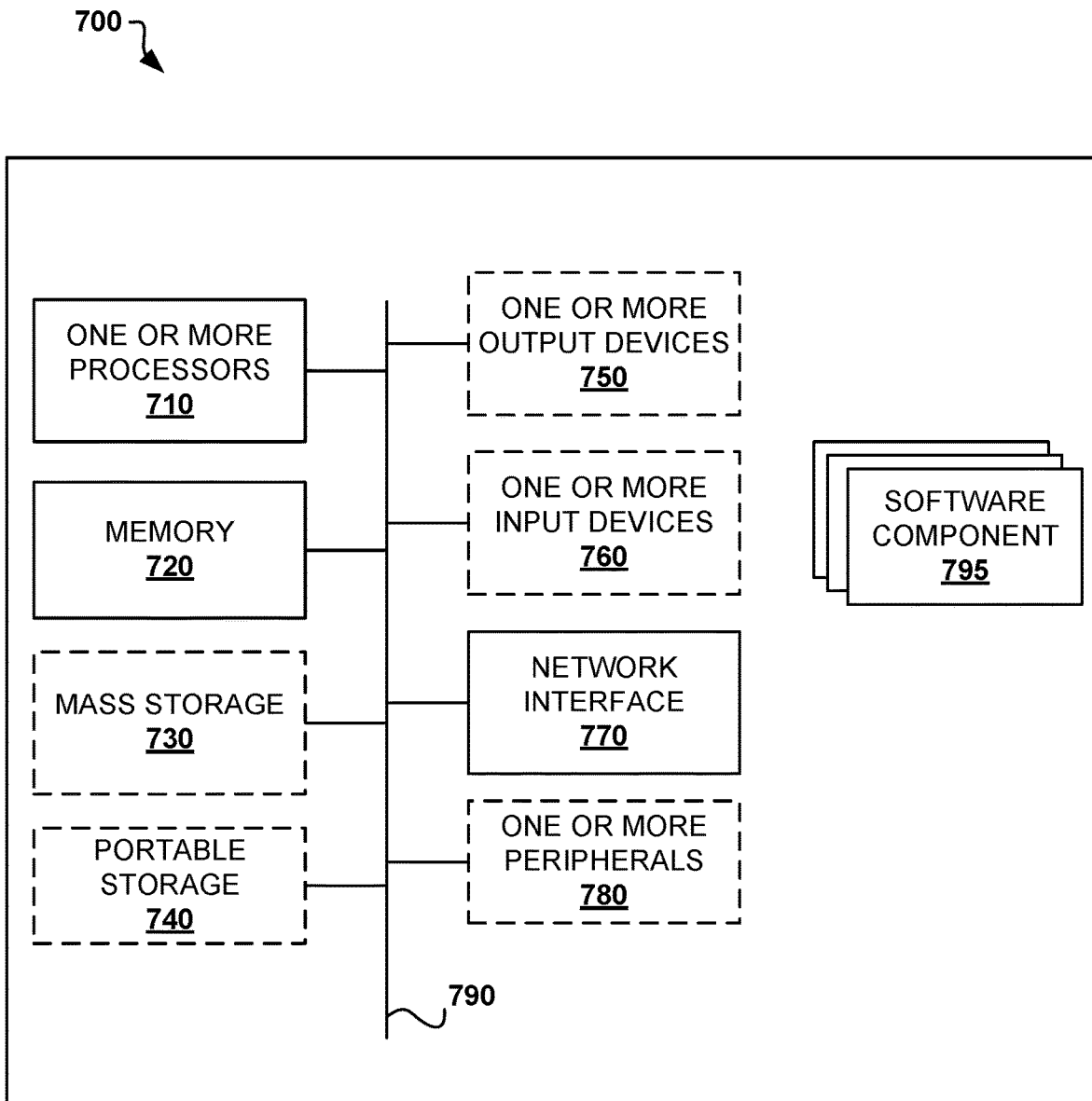
FIG. 7 shows an example computer system that can be used to implement the methods for portrait animation.

FIG. 7 illustrates an example computing system 700 that may be used to implement methods described herein. The computing system 700 may be implemented in the contexts of the likes of the computing device 110, the portrait animation system 220, the 3D face model 405, the sparse correspondence module 410, the scenario video preprocessing module 415, the target image preprocessing module 420, and the image animation and refinement module 430.

As shown in FIG. 7, the hardware components of the computing system 700 may include one or more processors 710 and memory 720. Memory 720 stores, in part, instructions and data for execution by processor 710. Memory 720 can store the executable code when the system 700 is in operation. The system 700 may further include an optional mass storage device 730, optional portable storage medium drive(s) 740, one or more optional output devices 750, one or more optional input devices 760, an optional network interface 770, and one or more optional peripheral devices 780. The computing system 700 can also include one or more software components 795 (e.g., ones that can implement the method for portrait animation as described herein).

The components shown in FIG. 7 are depicted as being connected via a single bus 790. The components may be connected through one or more data transport means or data network. The processor 710 and memory 720 may be connected via a local microprocessor bus, and the mass storage device 730, peripheral device(s) 780, portable storage device 740, and network interface 770 may be connected via one or more input/output (I/O) buses.

The mass storage device 730, which may be implemented with a magnetic disk drive, solid-state disk drive, or an optical disk drive, is a non-volatile storage device for storing data and instructions for use by the processor 710. Mass storage device 730 can store the system software (e.g., software components 795) for implementing embodiments described herein.

Portable storage medium drive(s) 740 operates in conjunction with a portable non-volatile storage medium, such as a compact disk (CD), or digital video disc (DVD), to input and output data and code to and from the computing system 700. The system software (e.g., software components 795) for implementing embodiments described herein may be stored on such a portable medium and input to the computing system 600 via the portable storage medium drive(s) 740.

The optional input devices 760 provide a portion of a user interface. The input devices 760 may include an alphanumeric keypad, such as a keyboard, for inputting alphanumeric and other information, or a pointing device, such as a mouse, a trackball, a stylus, or cursor direction keys. The input devices 760 can also include a camera or scanner. Additionally, the system 700 as shown in FIG. 7 includes optional output devices 750. Suitable output devices include speakers, printers, network interfaces, and monitors.

The network interface 770 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 770 may be a network interface card, such as an Ethernet card, optical transceiver, radio frequency transceiver, or any other type of device that can send and receive information. The optional peripherals 780 may include any type of computer support device to add additional functionality to the computer system.

The components contained in the computing system 700 are intended to represent a broad category of computer components. Thus, the computing system 700 can be a server, personal computer, hand-held computing device, telephone, mobile computing device, workstation, minicomputer, mainframe computer, network node, or any other computing device. The computing system 700 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Figure 8:
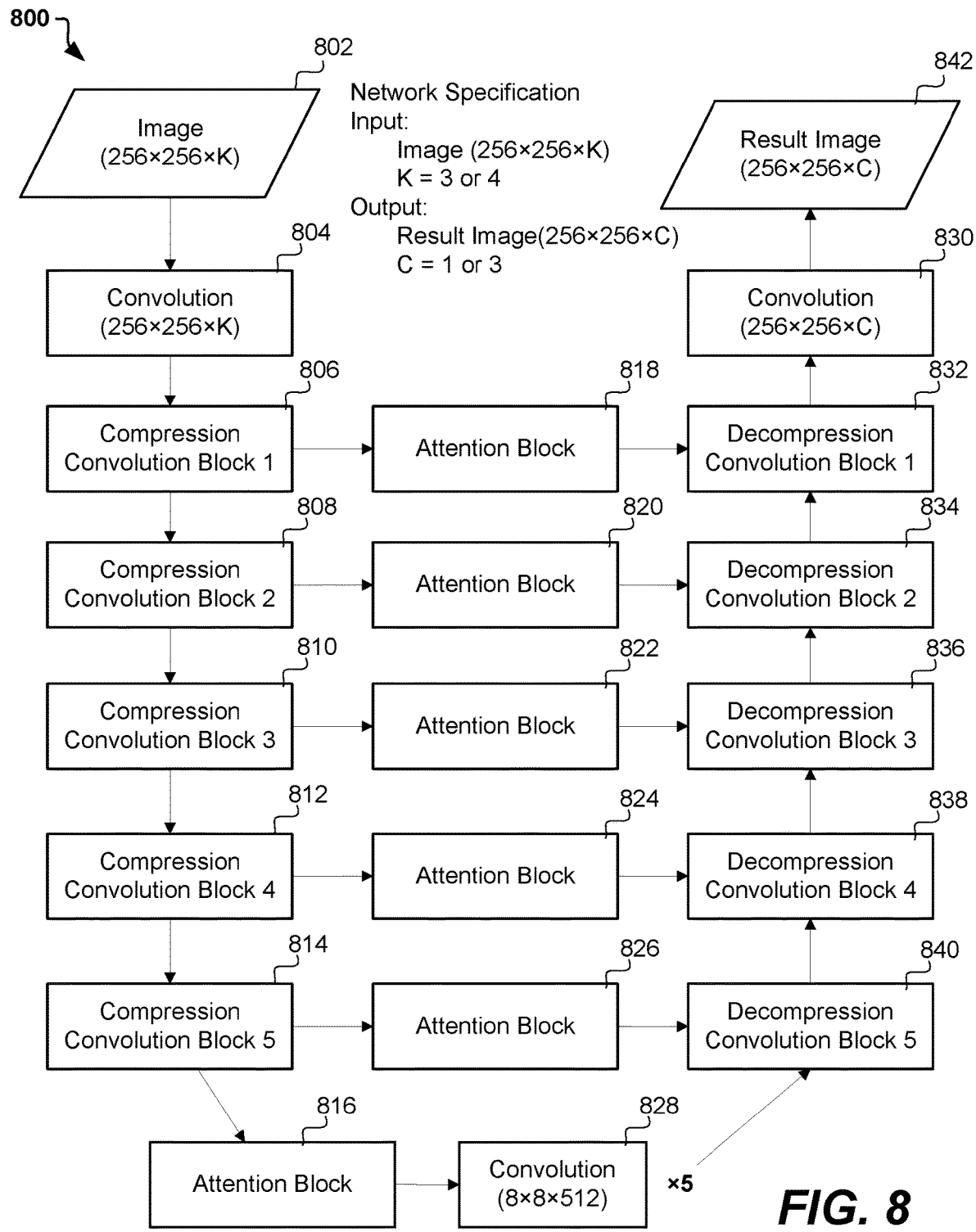
FIG. 8 is a block diagram of an example deep neural network (DNN) for background prediction.

FIG. 8 is a block diagram of a DNN 800 for background prediction, according to an example embodiment. The DNN 800 may include convolution layers 804, 828, and 830, compression convolution blocks 806, 808, 810, 812, and 814, attention blocks 816, 818, 820, 822, 824, and 826, and decompression convolution blocks 832, 834, 836, 838, and 840.

The compression convolution blocks 806, 808, 810, 812, and 814 may extract a semantic features vector from an image 802. The semantic features vector is then transposed back to a resulting image 842 by the decompression convolution blocks 832, 834, 836, 838, and 840 using information from the attention blocks 816, 818, 820, 822, 824, and 826. The image 802 may include target image 125. The resulting image 842 may include a predicted background of a part of the target image 125 covered by the target face 140.

Figure 9:
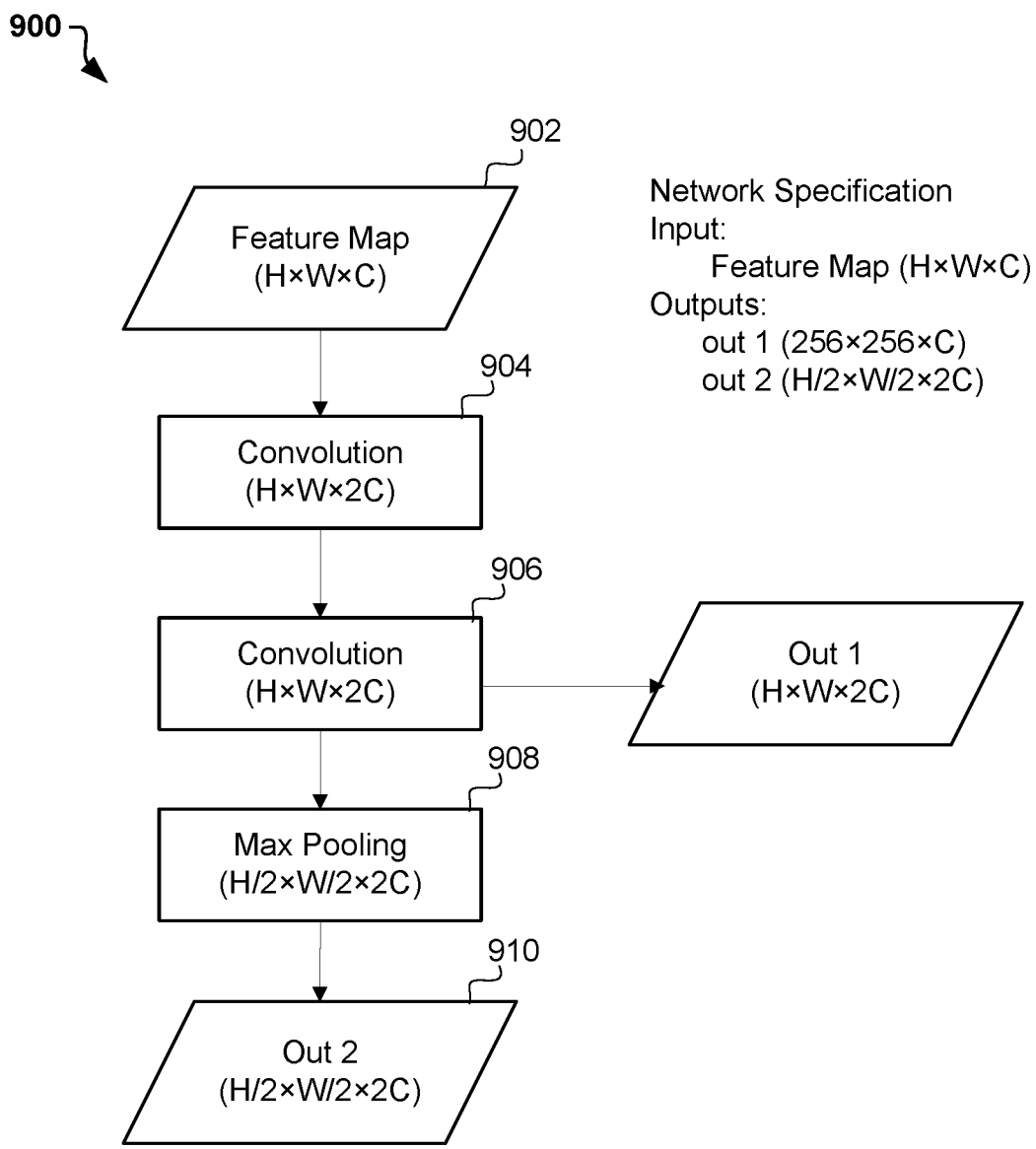
FIG. 9 is a block diagram of an example compression convolution block in a DNN.

FIG. 9 is a block diagram of an example compression convolution block 900. The compression convolution block 900 can be used as compression convolution blocks 806, 808, 810, 812, or 814 in the DNN 800 of FIG. 8. The compression convolution block 900 may include convolution layers 904 and 906, and max pooling layer 908. The compression convolution block 900 can generate, based on a feature map 902, an output 910 and an output 920.

Figure 10:
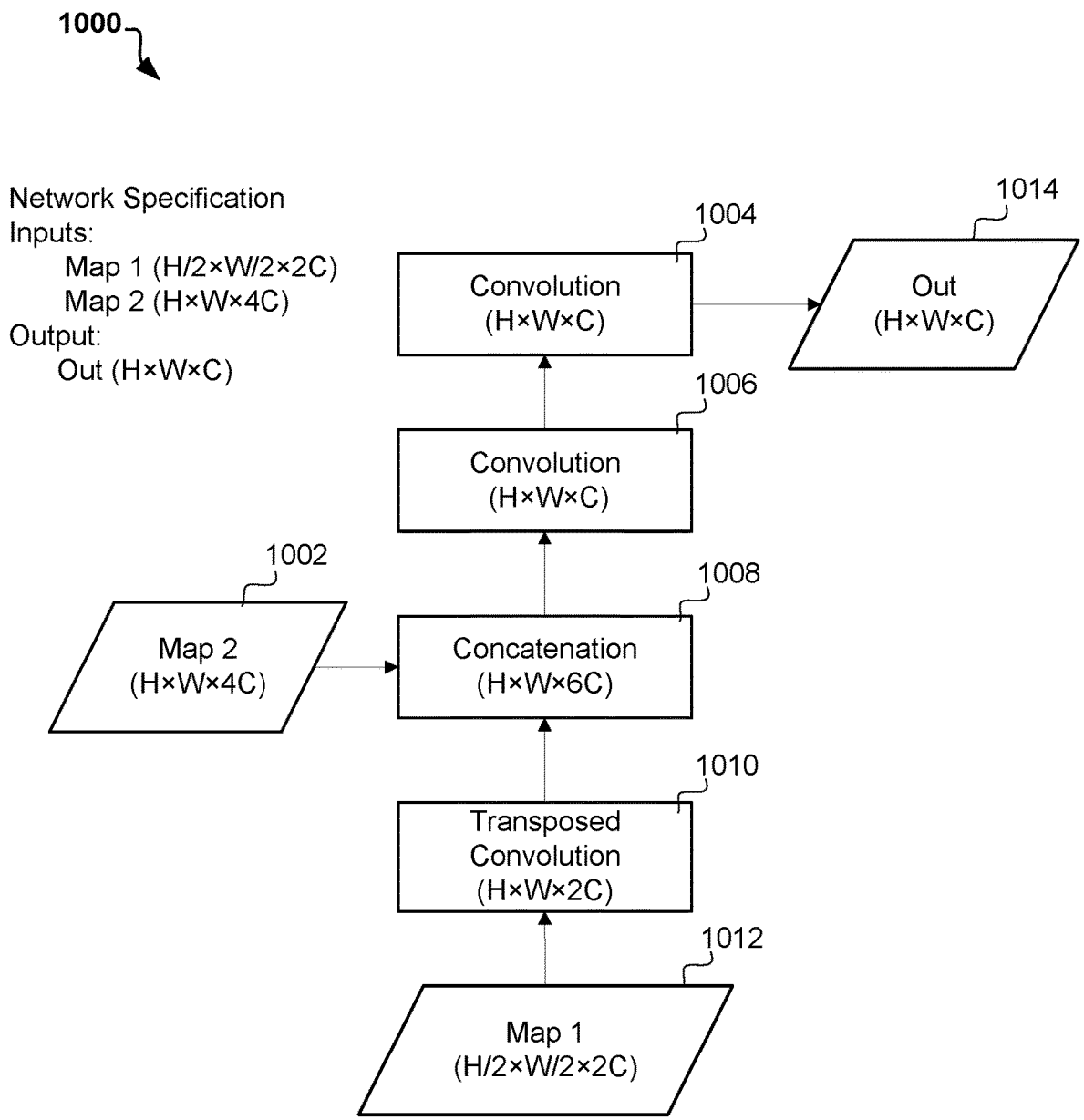
FIG. 10 is a block diagram of an example decompression convolution block in a DNN.

FIG. 10 is a block diagram of an example decompression convolution block 1000. The decompression convolution block 1000 can be used as decompression convolution blocks 832, 834, 836, 838, or 840 in the DNN 800 of FIG. 8. The decompression convolution block 1000 may include convolution layers 1004 and 1008, concatenation layer 1008, and transposed convolution layer 1010. The decompression convolution block 1000 can generate, based on a feature map 1002 and a feature map 1012, an output 1014.

Figure 11:
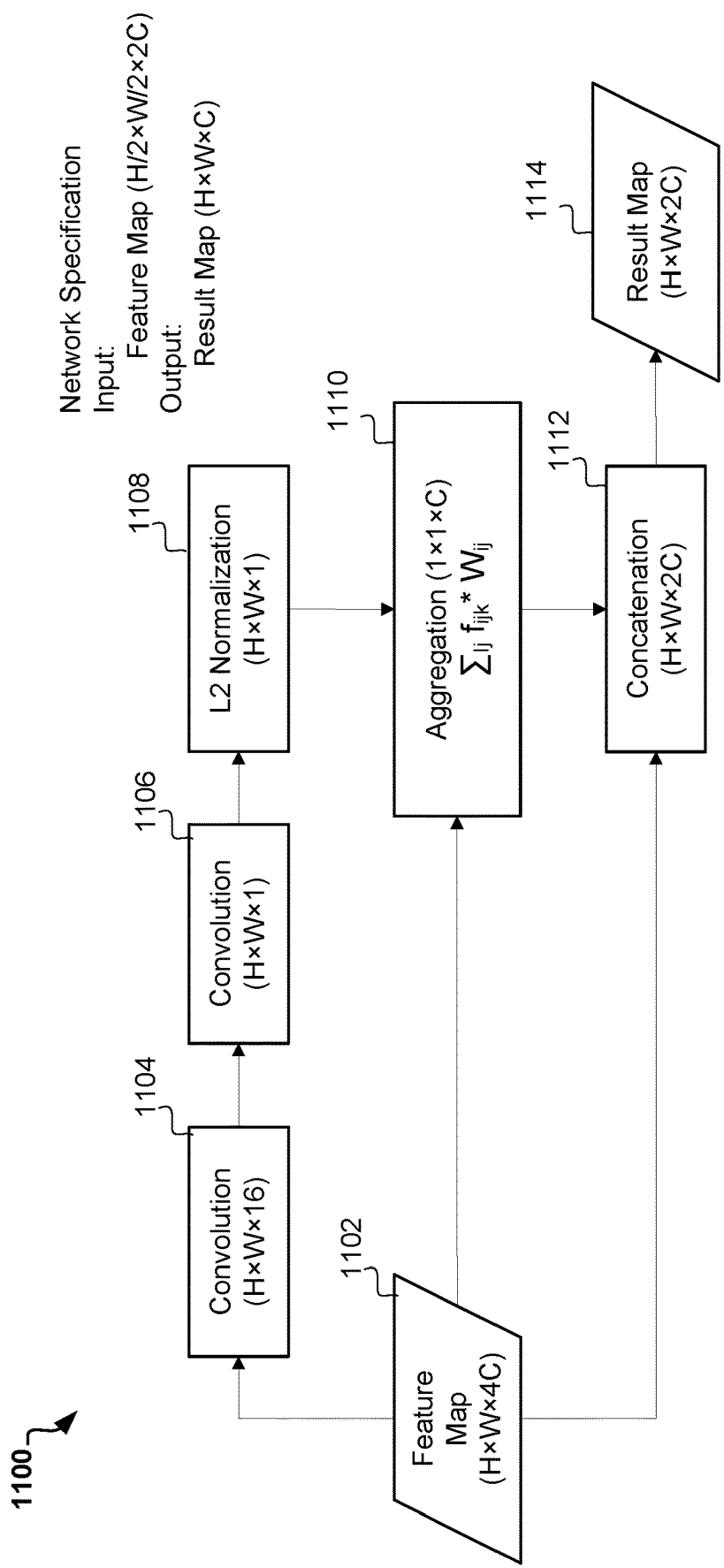
FIG. 11 is a block diagram of an example attention block in a DNN.

FIG. 11 is a block diagram of an example attention block 1100. The attention block 1100 can be used as attention blocks 816, 818, 820, 822, 824, or 826 in the DNN 800 of FIG. 8. The attention block 1100 may include convolution layers 1104 and 1106, a normalization layer 1108, an aggregation layer 1110, and a concatenation layer 1112. The attention block 1100 may generate, based on a feature map 1102, a resulting map 1114.

Figure 12:
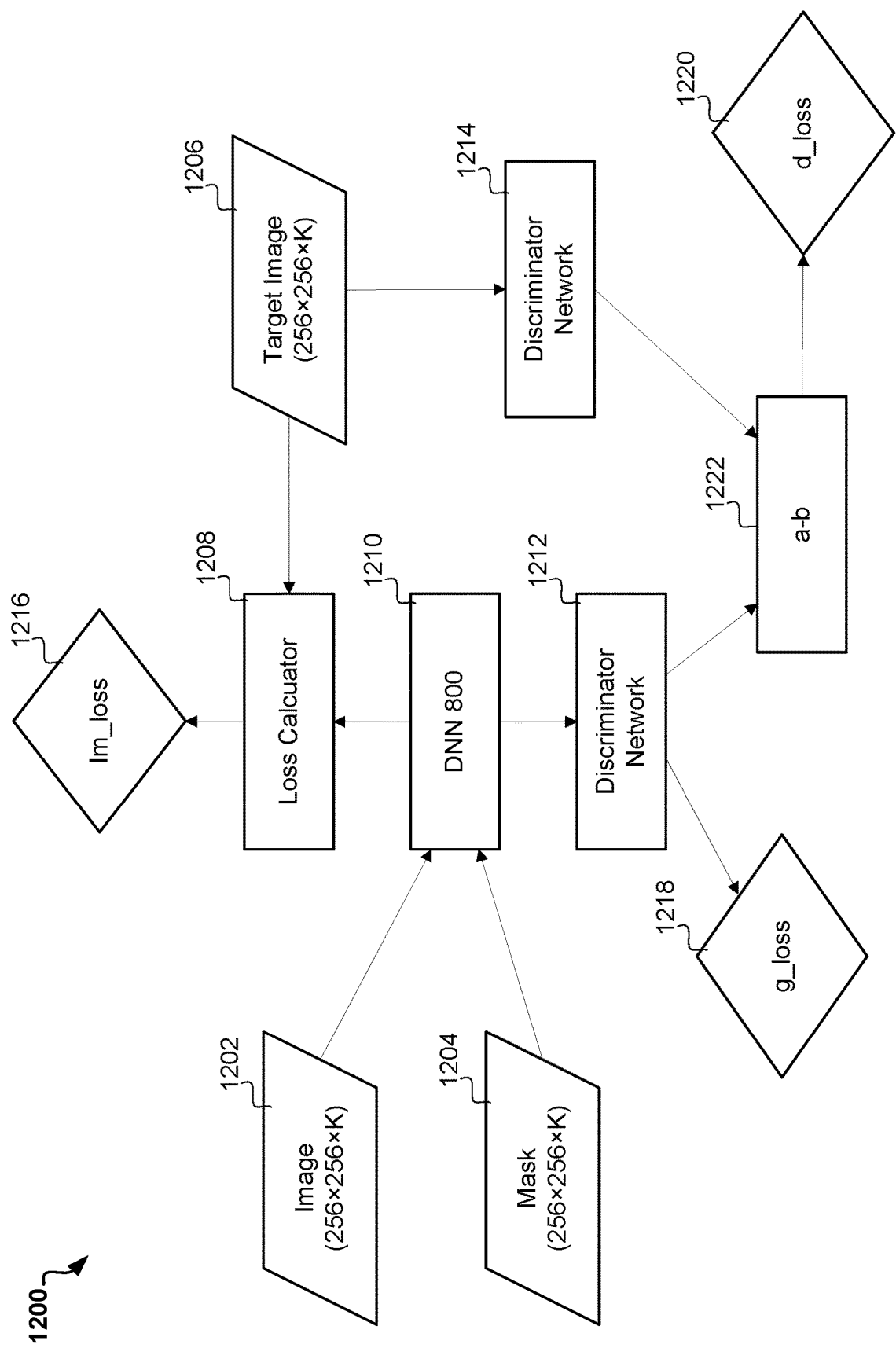
FIG. 12 is a block diagram of a learning scheme of a DNN.

FIG. 12 is a block diagram of a learning scheme 1200 for training of the DNN 800. The training scheme 1200 may include a loss calculator 1208, the DNN 800, discriminator networks 1212 and 1214, and a difference block 1222. The discriminator networks 1212 and 1214 can facilitate generation of photorealistic backgrounds by the DNN 800.

The DNN 800 can be trained based on a generated synthetic dataset. The synthetic dataset may include images of people positioned in front of a background image. The background image can be used as target image 1206. The images of people in front of the background image can be used as input data 1202 and insertion masks can be used as input data 1204.

The discriminator network 1212 may calculate generator loss 1218 (g_loss) based on output (predicted background) of DNN 800. The discriminator network 1214 may calculate a prediction value based on the target image 1206. The difference block 1222 may calculate discriminator loss 1220 (d_loss) based on the generator loss 1218 and the prediction value. The loss generator 1208 may calculate training loss 1216 (im_loss) based on an output of DNN 800 and the target image 1206.

The learning of the DNN 800 may include a combination of the following steps:

1. A "training step". In the "training step", weights of the discriminator networks 1212 and 1214 are kept unchanged and im_loss and g_loss are used for backward propagation.

2. A "pure training step". In the "pure training step", weights the of discriminator networks 1212 and 1214 are kept unchanged and only im_loss is used for for backward propagation.

3. A "discriminator training step". In the "discriminator training step", weights of DNN 800 are kept unchanged and d_loss is used for backward propagation.

The following pseudocode may describe a learning algorithm for the DNN 800:

1. Perform "pure training step" 100 times;
2. Repeat the following steps until a required quality is reached:
   a. Perform "discriminator train step" 5 times
   b. Perform "train step"

Figure 13:
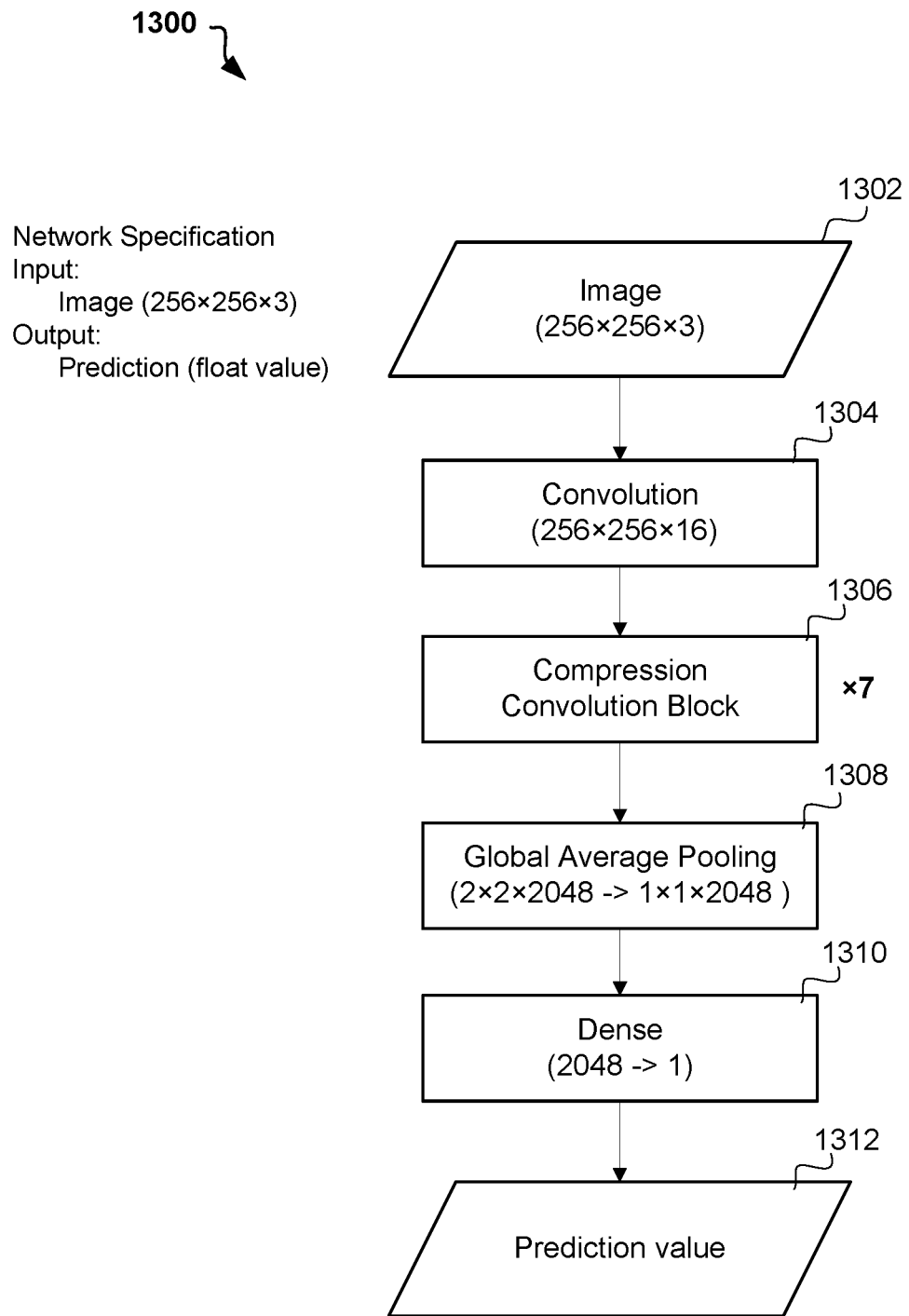
FIG. 13 is a block diagram of an example discriminator network.

FIG. 13 is a block diagram of an example discriminator network 1300. Discriminator network 1300 can be used as discriminator networks 1212 and 1214 in learning scheme 1200 of FIG. 12. The discriminator network 1300 may include a convolution layer 1304, a compression convolution block 1306, a global average pooling layer 1308, and a dense layer 1310. The discriminator network 1300 can generate a prediction value 1312 based on image 1302.

It should be noted that architecture of a DNN for background prediction can be different from the architecture of example DNN 800 described in the FIG. 8-13. For example, 3×3 convolutions 804-814 can be replaced by a combination of 3×1 convolution and 1×3 convolution. The DNN for background prediction may not include some of the blocks shown in the FIG. 8. For example, the attenuation blocks 816-820 can be excluded from the architecture of the DNN. The DNN for background prediction may also include a different number of hidden layers than the DNN 800 shown in FIG. 8.

It should be also noted, that a DNN similar to the DNN 800 described in FIG. 8-13 can be trained and used to predict other parts of target image 125. For example, the DNN can be used to predict or generate hidden regions of the target image 125 and fine-scale details to achieve a photorealistic result. The hidden regions may include a mouth region and eyes regions of the target face 140.

Thus, the methods and systems for photorealistic real-time portrait animation have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for portrait animation, the method comprising:
   receiving, by a computing device, a scenario video, the scenario video including at least one input frame, the at least one input frame including a first face;
   receiving, by the computing device, a target image, the target image including a second face;
   determining, by the computing device and based on the at least one input frame and the target image, two-dimensional (2D) deformations of the second face in the target image, wherein the 2D deformations when applied to the second face, modify the second face to imitate at least a facial expression of the first face, wherein the 2D deformations when applied to the second face, modify the second face to imitate a head rotation of the first face;
   determining that the head rotation exceeds a pre-determined rotation angle;
   in response to the determination, adjusting, based on the head rotation and a hair model, an image of hair associated with the second face; and
   applying, by the computing device, the 2D deformations to the target image to obtain at least one output frame of an output video.

2. The method of claim 1, further comprising modifying the at least one input frame to change a color of hair associated with the second face.

3. The method of claim 1, further comprising modifying the at least one input frame to change a hairstyle of hair associated with the second face.

4. The method of claim 1, further comprising modifying the at least one input frame to change age appearance of the second face.

5. The method of claim 1, further comprising applying a color correction to the at least one input frame.

6. The method of claim 1, further comprising applying a light correction to the at least one input frame.

7. The method of claim 1, further comprising:
   synthesizing, by the computing device and based on an image of a first body of a first person associated with the first face in the at least one input frame, an image of a second body of a second person associated with the second face, wherein the second body imitates at least a gesture associated with the first body of the first person; and
   inserting, by the computing device, the image of the second body of the second person in the at least one output frame.

8. The method of claim 1, further comprising:
   generating, by the computing device, one of a mouth region and an eyes region; and
   inserting, by the computing device, the one of the mouth region and the eyes region into the at least one output frame.

9. The method of claim 1, further comprising, prior to the applying the 2D deformations:
   performing, by the computing device and using a deep neural network (DNN), segmentation of the target image to obtain an image of the second face and a background; and
   wherein the applying, by the computing device, the 2D deformations includes applying the 2D deformations to the image of the second face to obtain a deformed face while keeping the background unchanged.

10. The method of claim 9, further comprising, upon the applying the 2D deformations:
    inserting, by the computing device, the deformed face into the background;
    predicting, by the computing device and using the DNN, a portion of the background in gaps between the deformed face and the background; and
    filling, by the computing device, the gaps with the predicted portion.

11. A computing device comprising:
    a processor; and a memory storing instructions that, when executed by the processor, configure the computing device to:
  receive a scenario video, the scenario video including at least one input frame, the at least one input frame including a first face;
  receive a target image, the target image including a second face;
  determine, based on the at least one input frame and the target image, two-dimensional (2D) deformations of the second face in the target image, wherein the 2D deformations when applied to the second face, modify the second face to imitate at least a facial expression of the first face, wherein the 2D deformations when applied to the second face, modify the second face to imitate a head rotation of the first face;
  determine that the head rotation exceeds a pre-determined rotation angle; and
  in response to the determination, adjust, based on the head rotation and a hair model, an image of hair associated with the second face; and
  apply the 2D deformations to the target image to obtain at least one output frame of an output video.

12. The computing device of claim 11, wherein the instructions further configure the computing device to modify the at least one input frame to change a color of hair associated with the second face.

13. The computing device of claim 11, wherein the instructions further configure the computing device to modify the at least one input frame to change a hairstyle of hair associated with the second face.

14. The computing device of claim 11, wherein the instructions further configure the computing device to modify the at least one input frame to change age appearance of the second face.

15. The computing device of claim 11, wherein the instructions further configure the computing device to apply a color correction to the at least one input frame.

16. The computing device of claim 11, wherein the instructions further configure the computing device to apply a light correction to the at least one input frame.

17. The computing device of claim 11, wherein the instructions further configure the computing device to:
  synthesize, based on an image of a first body of a first person associated with the first face in the at least one input frame, an image of a second body of a second person associated with the second face, wherein the second body imitates at least a gesture associated with the first body of the first person; and
  insert the image of the second body of the second person in the at least one output frame.

18. The computing device of claim 11, wherein the instructions further configure the computing device to, prior to the applying the 2D deformations:
  perform, using a DNN, segmentation of the target image to obtain an image of the second face and a background; and
  wherein the applying the 2D deformations includes applying the 2D deformations to the image of the second face to obtain a deformed face while keeping the background unchanged.

19. The computing device of claim 18, wherein the instructions further configure the computing device to, upon the applying the 2D deformations:
  insert the deformed face into the background;
  predict, using the DNN, a portion of the background in gaps between the deformed face and the background; and
  fill the gaps with the predicted portion.

20. A non-transitory computer-readable storage medium, the computer-readable storage medium including instructions that when executed by a computing device, cause the computing device to:
  receive a scenario video, the scenario video including at least one input frame, the at least one input frame including a first face;
  receive a target image, the target image including a second face;
  determine based on the at least one input frame and the target image, two-dimensional (2D) deformations of the second face in the target image, wherein the 2D deformations when applied to the second face, modify the second face to imitate at least a facial expression of the first face, wherein the 2D deformations when applied to the second face, modify the second face to imitate a head rotation of the first face;
  determine that the head rotation exceeds a pre-determined rotation angle;
  in response to the determination, adjust, based on the head rotation and a hair model, an image of hair associated with the second face; and
  apply the 2D deformations to the target image to obtain at least one output frame of an output video.

* * * * *